UNITED STATES PATENT OFFICE.

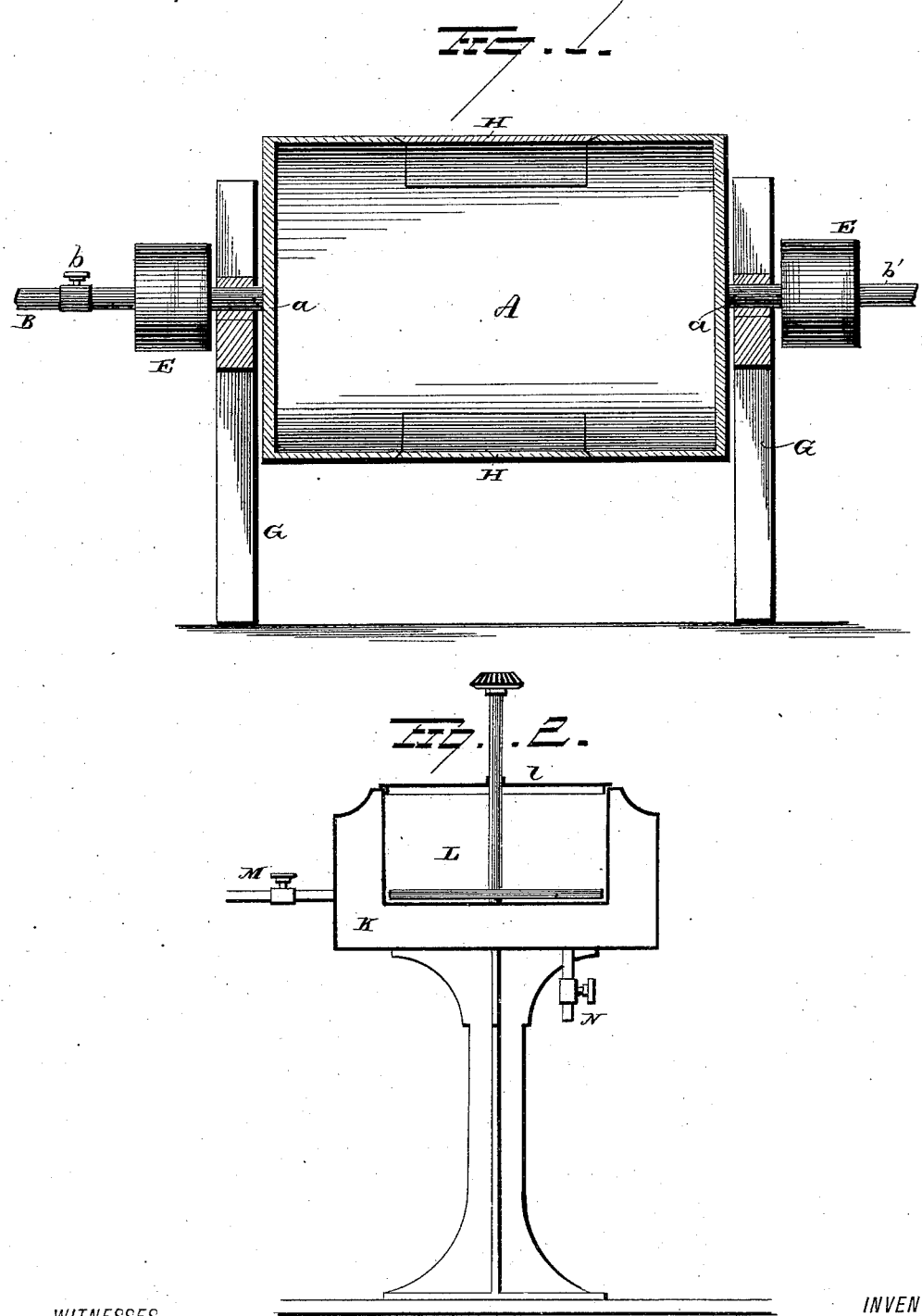

GEORGE LEDER, OF DEMOPOLIS, ALABAMA.

PROCESS OF EXTRACTING OIL FROM COTTON AND OTHER SEED.

SPECIFICATION forming part of Letters Patent No. 307,124, dated October 28, 1884.

Application filed December 18, 1883. (No model.)

*To all whom it may concern:*

Be it known that I, GEORGE LEDER, of Demopolis, in the county of Marengo and State of Alabama, have invented certain new and useful Improvements in Processes of Extracting Oil from Cotton and other Seed; and I do hereby declare the following to be a full, clear, and exact description of the invention, such as will enable others skilled in the art to which it appertains to make and use the same.

My invention relates to an improvement in the process of extracting oil from cotton and other seed.

Heretofore many different processes have been resorted to for extracting oil from cotton-seed. Among the number are the following: Water is added to the seed or steam is commingled therewith, and the moistened seed is then crushed and then dried, and afterward the oil is extracted therefrom by percolation with a hydrocarbon solvent. Again, the seed is first crushed, then dried, and afterward subjected to pressure to express the oil therefrom. Again, the seed is first crushed, and then moistened by water or steam, and then pressed. Again, the seed is first hulled, then pressed, exposed to the action of warm air, then moistened, then warmed, and then pressed. These different processes are objectionable and defective for various reasons. When the seed is simply crushed and cooked or baked before pressing, the meal is liable to become overcooked or unevenly cooked, and thereby prevents the extraction of the maximum quantity of oil, and, further, operates to impart a dark color to the oil. When the seed is crushed, then moistened and pressed, it is impossible to secure as large quantity and as good quality of oil as can be obtained by drying the seed after it has been moistened.

The object of my invention is to obviate the defects in the processes hitherto resorted to in this art; and with this end in view my invention consists in a process of extracting oil from cotton-seed, consisting in first crushing the seed; secondly, in moistening, warming, and stirring the seed; thirdly, in subjecting the seed to a dry heat, and finally, in expressing the oil therefrom.

For the purpose of making the explanation of my process clear, reference will be made to the accompanying drawings, in which—

Figure 1 is a view of the meal-moistener, and Fig. 2 is a view of the steam-heater.

A, Fig. 1, represents a drum made of suitable material and any desired dimensions. This drum is provided with tubular bearings *a*, by means of which it is journaled in the supporting-frame G. The drum A is further provided with the doors H, situated diametrically opposite or in any other convenient positions for putting in and taking out the meal. The steam-pipe B, having the valve *b*, enters the drum A through one of the tubular bearings *a*, and an exhaust-pipe, *b'*, is placed in the other tubular bearing. The bearings *a* are provided with the band-pulleys E, which are connected with driving-pulleys on a counter-shaft, by means of which the drum A is rotated.

K, Fig. 2, represents a steam-chest, in which the boiler L is fitted in such a manner that the steam surrounds the boiler except the top. The boiler L is provided with a lid, *l*. This steam-chest K is made of suitable material to withstand a high pressure of steam. It is preferably made of cast-iron, and the pressure is from forty to eighty pounds. The chest K has a suitable feed-pipe, M, and an exhaust-pipe, N.

My process consists more particularly in, first, crushing the cotton-seed or linseed by means of any of the approved means in use; secondly, in exposing the crushed seed, now called meal, directly to steam in the drum A; the steam is admitted through the pipe B while the drum rotates, causing the meal to fall from side to side, thus bringing every particle of the meal in contact with the steam; thirdly, in subjecting this moistened meal to steam heat in the boiler L until the oil-cells are in a condition to readily give up their oil; and, lastly, in submitting this cooked meal to suitable presses, whereby the oil is obtained.

My object in exposing the meal to steam in the drum A is to mix a sufficient amount of moisture with the meal to allow the meal to be heated in the boiler L until the oil-cells are softened and opened without the loss of any oil by the evaporation of the natural moisture of the seed.

My process has the following advantages: The oil obtained is of a lighter color, sweeter, and purer, and hence of a higher market value, while the oil is more easily expressed, and the amount obtained from a given quantity of seed is materially increased.

I wish it to be understood that the apparatus used in carrying out my process, and herein described, forms no part of the invention herein claimed, said apparatus being reserved as the subject-matter of another application filed of even date herewith.

Having fully described my invention, what I claim as new, and desire to secure by Letters Patent, is—

The process of extracting oil from cotton-seed and linseed, consisting in, first, crushing the seed; secondly, moistening, warming, and stirring the warm moistened seed; thirdly, subjecting the moistened seed to a dry heat; and, finally, in pressing the oil from the dried meal, substantially as set forth.

In testimony whereof I have signed this specification in the presence of two subscribing witnesses.

GEORGE LEDER.

Witnesses:
R. E. CORRY,
W. P. CHENEY.